United States Patent [19]
Bächle

[11] Patent Number: 5,871,402
[45] Date of Patent: Feb. 16, 1999

[54] COMPOSITE INTERNALLY THREADED FASTENER AND METHOD OF MAKING THE SAME

[75] Inventor: Ewald Bächle, Hausach, Germany

[73] Assignee: Erich Neumayer GmbH & Co. KG, Hausach, Germany

[21] Appl. No.: 760,694

[22] Filed: Dec. 5, 1996

[30] Foreign Application Priority Data

Dec. 9, 1995 [DE] Germany ............... 195 46 003.0

[51] Int. Cl.$^6$ .................................................. B23G 5/00
[52] U.S. Cl. ....................... 470/2; 470/20; 29/525.02
[58] Field of Search .................... 470/2, 18, 20, 470/24, 25, 26, 42, 49; 29/507, 512, 525.01, 525.02, 525.05, 525.11, 525.13

[56] References Cited

U.S. PATENT DOCUMENTS

| | | | |
|---|---|---|---|
| 2,375,325 | 5/1945 | Robertson | 470/2 |
| 2,703,418 | 3/1955 | Poupitch | 470/2 |
| 3,304,562 | 2/1967 | Schmidt | 470/2 |
| 3,757,372 | 9/1973 | Dahl et al. | 470/2 |

FOREIGN PATENT DOCUMENTS

| | | |
|---|---|---|
| OS 43 07 090 | 10/1993 | Germany. |
| OS 43 07 091 | 10/1993 | Germany. |
| 195 32 709.8 | 3/1996 | Germany. |
| 625-833 | 9/1978 | U.S.S.R. .......................... 470/18 |

*Primary Examiner*—Joseph J. Hail, III
*Assistant Examiner*—Ed Tolan
*Attorney, Agent, or Firm*—Darby & Darby

[57] ABSTRACT

A composite fastener which is comprised of a nut having a neck at one of its axial ends, and of a washer which at least partially surrounds the neck and is adjacent an external shoulder of a non-circular main section of the nut. That end of the neck which is remote from the shoulder is expanded to prevent an unintentional separation of the washer from the nut. The making of an internal thread in the nut is carried out subsequent to the expansion of the neck. The nut and the washer can constitute converted blanks which are converted by resorting to a press forging or cold forming or turning procedure.

20 Claims, 3 Drawing Sheets

COMPOSITE INTERNALLY THREADED FASTENER AND METHOD OF MAKING THE SAME

BACKGROUND OF THE INVENTION

The invention relates to improvements in internally threaded fasteners, and more particularly to improvements in internally threaded fasteners of the type wherein a nut carries a neck at one of its axial ends and the neck is surrounded by a ring-shaped member (hereinafter called washer for short). Fasteners of such character can be utilized, for example, to separably secure the hub of a wheel to an axle of a motor vehicle.

The invention also relates to a novel and improved method of making composite internally threaded fasteners of the above outlined character.

It is already known to provide a nut with an internally threaded main section having a non-circular external outline so that it can be readily engaged and rotated by a wrench or another suitable tool or implement, and to make one axial end portion of the main section of one piece with a neck which is adjacent an external shoulder of the main section and is surrounded by a washer. That end of the neck which is remote from the shoulder is deformed (particularly expanded) so that it prevents unintentional separation of the washer from the nut and it maintains (or can maintain) the washer in close proximity to or in actual contact with the shoulder of the main section. The remote end of the neck can be deformed to overlie the radially innermost portion of that end face of the washer which faces away from the main section and its shoulder.

In accordance with a presently known procedure, a blank is converted into a nut having a main section and a neck by resorting to a press forging or an analogous operation which involves a heating of the blank. The neck is thereupon subjected to a separate cold forming treatment or to a separate turning treatment in order to increase its inner diameter beyond the root diameter of the internal thread of the main section. Thus, the deformation of the neck (in order to couple the washer to the nut) takes place subsequent to the making of an internal thread in the nut.

OBJECTS OF THE INVENTION

An object of the invention is to provide an internally threaded composite fastener of the above outlined character at a cost well below the cost of heretofore known fasteners.

Another object of the invention is to provide a novel and improved method of making the fastener.

A further object of the invention is to provide a novel and improved sequence of steps which are to be carried out in connection with the practice of the improved method.

An additional object of the invention is to provide a method which renders it possible to center the thread forming tool or tools in a novel and improved way.

Still another object of the invention is to provide a composite internally threaded fastener which is obtained by resorting to the above outlined method.

A further object of the invention is to provide a novel and improved connection between the internally threaded main section and the neck of the improved fastener on the one hand, and the washer of such fastener on the other hand.

Another object of the invention is to provide a machine or a device, such as a motor vehicle, which employs composite internally threaded fasteners of the above outlined character.

A further object the invention is to provide a novel and improved internally theaded composite fastener which can be put to use in conjunction or combination with conventional externally threaded fasteners.

SUMMARY OF THE INVENTION

One feature of the invention resides in the provision of a method of making and assembling a fastener which is composed of (a) a nut comprising a torque-receiving tubular section having a first end portion and a second end portion, and a neck which is coaxial with the section and has a first end which is of one piece with one end portion of the section and a second end, and (b) a substantially ring-shaped washer. The improved method comprises the steps of converting a blank (such as a metallic blank) into the nut, inserting the neck of the thus obtained nut at least partially through the substantially ring-shaped washer in such a way that the second end of the inserted neck is accessible to treatment, expanding the accessible second end of the neck to thus establish a non-separable connection (such as a form-locking connection) between the washer and the nut, and thereafter providing at least the tubular section of the nut with an internal thread.

The converting step can include or constitute massive forming of the nut, and such massive forming can involve press forging or cold forming. It is also possible to resort to a converting step which involves turning.

The method can also include a step of tempering the converted blank and/or the step of surface treating the converted blank; the surface treating step can be carried out prior or subsequent to the inserting step.

The thread providing step can include cutting or tapping the internal thread at least into the tubular section of the converted blank.

As mentioned above, the converting step can include massive forming of the nut, and the method can further comprise the step of converting a second blank into the washer prior to the inserting step; the step of converting the second blank can include massive forming of the washer, and such massive forming of the washer can involve press forging or press forging followed by cold forming. Alternatively, the step of converting the second blank into the washer can merely involve a cold forming operation. It is also possible to convert the second blank into the washer by resorting to a turning operation.

The converted second blank can be tempered and/or surface treated, e.g., subsequent to the inserting step.

Another feature of the invention resides in the provision of an improved fastener which comprises a nut including a torque-receiving tubular section having first and second end portions and a neck which is coaxial with the section and has a first end of one piece with one end portion of the section and a second end. At least the tubular section of the nut has an internal thread and the one end portion of the tubular section is provided with an external shoulder. The fastener further comprises a substantially ring-shaped washer which at least partially surrounds the neck and is adjacent the shoulder. The second end of the neck and the washer define or establish a connection, such as a form-locking connection, which prevents unintentional separation of the washer from the nut. The improvement resides in that the form-locking connection is established prior to the making of the internal thread, i.e., the nut and the washer are already coupled to each other before the tubular section is provided with an internal thread, preferably by operating in a direction from the connection toward the other end portion of the tubular section.

The tubular section can be provided with a non-circular (such as hexagonal or oval) external surface which can be engaged by a torque transmitting implement, e.g., by a suitable wrench.

The connection between the nut and the washer can be such that the neck is rotatable relative to the washer and/or vice versa.

The washer can be provided with a substantially plane, with a substantially concave or with a substantially convex end face which faces away from the shoulder of the nut. The washer is or can be resiliently deformable so that it can undergo an elastic deformation in response to engagement of its end face with an object (e.g., with the central portion of a wheel) upon tightening of the tubular section on an externally threaded second fastener, such as a bolt or stud having an external thread which mates with the internal thread. The resilient deformation of the washer can be attributable to one or more parameters including the selected cross-sectional area of the washer, a radial dimension of the washer (i.e., a dimension as measured radially of the common axis of the tubular section and the neck), the curvature of the concave or convex end face, and the selected material (e.g., spring steel) of the washer.

That side of the washer which confronts the shoulder defined by the other end portion of the tubular section of the nut can make with the shoulder a preferably relatively small acute angle which diverges in a direction substantially radially of and away from the common axis of the tubular section and the neck of the nut.

If the washer has a substantially concave end face which faces away from the shoulder of the tubular section, such end face and a plane which is at least substantially normal to the axis of the nut can define a second angle which also diverges in a direction substantially radially outwardly of and away from the common axis of the tubular section and the neck and which can be smaller than the aforementioned angle defined by the shoulder and the adjacent side of the washer.

The tubular section can further comprise a substantially sleeve-like extension which is of one piece with the other end portion of such section. The extension can be provided with slots which extend in at least substantial parallelism with the axis of the nut and which alternate with tongues (as seen in the circumferential direction of the extension).

The fastener can constitute a means for securing a wheel to an axle of a motor vehicle.

The novel features which are considered as characteristic of the invention are set forth in particular in the appended claims. The improved fastener itself, however, both as to its construction and the method of making and assembling the same, together with numerous additional important features and advantages thereof, will be best understood upon perusal of the following detailed description of certain presently preferred specific embodiments with reference to the accompanying drawings.

BRIEF DESCRIPTION OF THE DRAWINGS

FIG. 1b is a plan view of the nut which is shown in FIG. 1a;

FIG. 2b is a plan view of the fastener which is shown in FIG. 2a;

FIG. 3b is a plan view of the composite fastener which is shown in FIG. 3a.

DESCRIPTION OF PREFERRED EMBODIMENTS

Figure 1A:
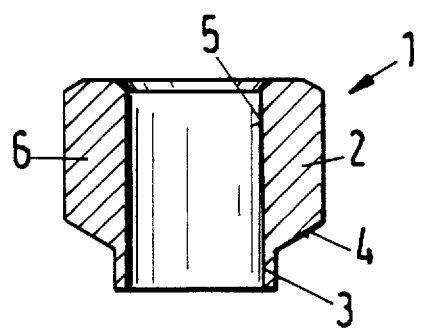
FIG. 1a is an axial sectional view of a nut as it appears prior to assembly with a washer and prior to the provision of an internal thread in its main section.
Figure 1B:
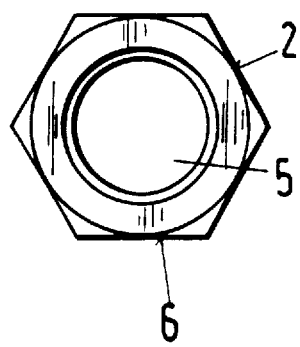

FIGS. 1a and 1b show a partially finished nut 1 consisting of a main section 2 having a first end portion remote from and a second end portion of one piece with a coaxial section or neck 3 (hereinafter called neck). The section 2 serves to receive torque from a suitable implement (such as a wrench, not shown) which can turn the section 2 when the latter meshes or mates with an externally threaded fastener, e.g., a bolt or stud, not shown. To this end, the section 2 has a non-circular external surface so that it can be readily and reliably engaged by the selected implement; the illustrated section 2 is provided with six external facets 6. The second end portion of the section 2 has a substantially radially extending shoulder 4 which can constitute a conical surface diverging radially outwardly in the axial direction of the nut 1 and away from the neck 3. The phantom line which is shown in FIG. 1 denotes the common axis of the section 2 and the neck 3, and the reference character 5 denotes a cylindrical passage which is also common to the section 2 and neck 3.

The conical shoulder 4 can be replaced by a shoulder located in a plane which is normal to the axis of the nut 1, or by a spherical (convex) shoulder without departing from the spirit of the invention.

The partially finished nut which is shown in FIGS. 1a and 1b can constitute a converted metallic blank, and such converting step can involve massive forming, e.g., a hot forming (such as press forging) or a cold forming operation, or turning. The diameter of the passage 5 can approximate or match the root diameter of the thread 13 (shown in FIGS. 2a and 2b) which, in accordance with a feature of the method of the present invention, is formed subsequent to insertion of the still undeformed (cylindrical) neck 3 into the central opening 10 of a substantially ring-shaped member 8 (hereinafter called washer).

Figure 2A:
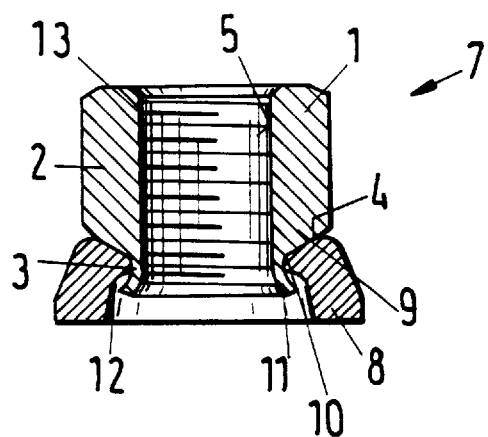
FIG. 2a is an axial sectional view of an assembled internally threaded fastener which employs the nut of FIGS. 1a and 1b.
Figure 2B:
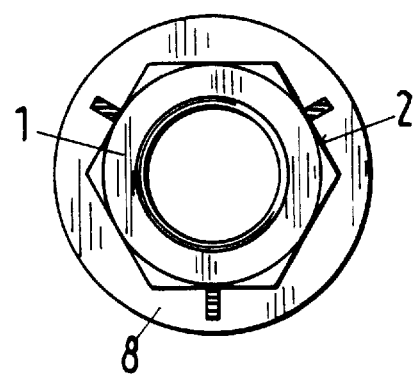

If desired or necessary, the main section 2 of the nut 1 can be provided with a radially outwardly extending collar (not shown) in a region immediately above the radially outermost portion of the shoulder 4 (as viewed in FIG. 1a or 2a). In other words, if provided, such collar extends radially outwardly beyond the facets 6 of the section 2.

The feature that the diameter of the passage 5 is constant all the way from the free end portion of the section 2 to that end of the neck 3 which is remote from the shoulder 4 distinguishes the partially finished nut 1 of FIGS. 1a and 1b from conventional nuts. As a rule, such conventional nuts are formed by resorting to a conversion of a blank in the presence of heat, and the conversion is followed by a cold forming of the neck or by resorting to a turning operation for the purpose of increasing the diameter of that portion of the passage which is provided in the neck.

FIG. 2a shows that the washer 8 has a side, surface or shoulder 9 which is closely adjacent to or actually abuts the external shoulder 4 and which can have an inclination complementary to that of the shoulder 4. The material of the washer 8 can but need not be identical with that of the nut 1. For example, the composite internally threaded fastener 7 of FIGS. 2a and 2b can be assembled of a metallic or non-metallic nut 1 having a first strength or stability, and of a metallic or non-metallic washer 8 having a different second strength or stability (or another characteristic, such as resiliency).

The connection between the washer 8 and the neck 3 can be such that the washer can rotate relative to the neck and/or vice versa. The configuration of the shoulder 4 and of the surface 9 is preferably such that the washer 8 can be maintained in a relatively large surface-to-surface contact with the section 2 without undergoing any, or without undergoing any appreciable, deformation.

FIG. 2a shows that the free end 11 of the neck 3 is deformed radially outwardly within the central opening 10 of the washer 8 so that it overlies an internal shoulder 12 of the washer. This results in the establishment of a form-locking connection which ensures that the washer 8 cannot be unintentionally separated from the nut 1 as well as that the surface 9 of the washer is maintained at an optimum axial distance from the external shoulder 4 of the section 2. As can be seen in FIG. 2a, the mounting of the washer 8 on the nut 1 can be such that the washer surrounds the neck 3 with a selected amount of radial play.

The deformed end 11 of the neck 3 can be said to constitute an outturned collar which cooperates with the undercut or otherwise formed internal shoulder 12 to ensure the retention of the washer 8 in a selected axial position relative to the section 2.

The internal thread 13 is provided in the nut 1 subsequent to insertion of the neck 3 into the opening 10 of the washer and subsequent to expansion of the end 11 to form the aforementioned collar which overlies the internal shoulder 12. As can be seen in FIG. 2a, the internal thread 13 is provided in the entire section 2 but its lower end can extend into that end of the neck 3 which is of one piece with the lower end portion of the section 2. The internal surface of the collar 11 can serve as a guide for the thread forming (e.g. tapping or cutting) tool to properly center such tool during the making of the internal thread 13.

It will be appreciated that the illustrated washer 8 constitutes but one of numerous washers which can be assembled with the nut 1 in accordance with the method of the present invention, i.e., in such a way that the connection between the nut and the washer is established (at least to the extent that the washer surrounds the neck of the nut) prior to forming of the internal thread in the neck and/or in the main section of the nut.

The washer can constitute a second converted blank which is converted by resorting to a massive forming procedure (such as cold forming or pres forging, e.g., press forging followed by cold forming). It is also possible to obtain the washer from a suitable blank by resorting to a turning procedure. In accordance with a presently preferred procedure, a blank can be converted into a washer 8 or into an equivalent washer by resorting to press forging (i.e., a treatment in the presence of heat), followed by cold forming which, in turn is followed by turning (such turning imparts to the washer its final shape).

The converted blanks which constitute the nut 1 and the washer 8 can be subjected to one or more additional treatments (e.g., tempering) prior or subsequent to introduction of the neck 3 into the opening 10 of the washer. The insertion of the neck 3 into the opening 10 is carried out in such a way that the free end 11 of the neck is accessible for expansion, i.e., to form the collar which overlies the internal shoulder 12 to establish the aforementioned connection between the washer and the nut 1. The deformation of the free end 11 of the neck 3 is preferably a plastic deformation. The extent of such radially outwardly directed plastic deformation can but need not be so pronounced that the surface 9 is urged against the shoulder 8 with a force which normally prevents the neck 3 and the washer 8 to turn relative to each other.

Furthermore, and as already mentioned above, the configuration of the internal surface of the collar (i.e., of the radially expanded end 11 of the neck 3) can be selected in such a way that such internal surface serves as a guide (centering means) for the thread cutting, tapping, rolling or other tool which is selected to form the internal thread 13. This contributes significantly to the quality of the internal thread and of the entire composite fastener 7. It will be seen that, in accordance with a desirable feature of the invention, the establishment of a form-locking or other suitable connection between the nut 1 and the washer 8 exhibits the important advantage that, as soon as the making of the connection is completed, the expanded end 11 of the neck 3 can serve an additional important function of centering the tool which is selected to provide at least the section 2 of the nut 1 with an internal thread. This renders it possible to dispense with the heretofore customary practice of enlarging that portion of the passage in the nut which is provided in the neck in order to render it possible to properly center a tapping or other selected thread forming tool. All in all, the improved method contributes to simplicity and to lower cost of the making of the improved composite internally threaded fastener.

It has been found that a hot forming of the washer and/or of the nut (e.g., a press forging technique) often contributes to a lower cost of such parts. However, and as already pointed out before, it is also possible to convert the washer and/or the nut from a suitable blank by resorting to a cold forming procedure and/or turning or a combined hot forming, cold forming and turning technique.

If necessary, the nut 1 and/or the washer 8 can be subjected to a suitable surface treatment, either prior or subsequent to establishment of a connection between the washer and the neck 3. It is presently preferred to carry out such surface treatment subsequent to the establishment of the connection between the neck 3 and the washer 8.

The making of the thread 13 can be carried out in a numerically controlled thread forming machine. However, it is equally possible to resort to various other types of thread forming (such as thread cutting, rolling or tapping) machines.

Figure 3A:
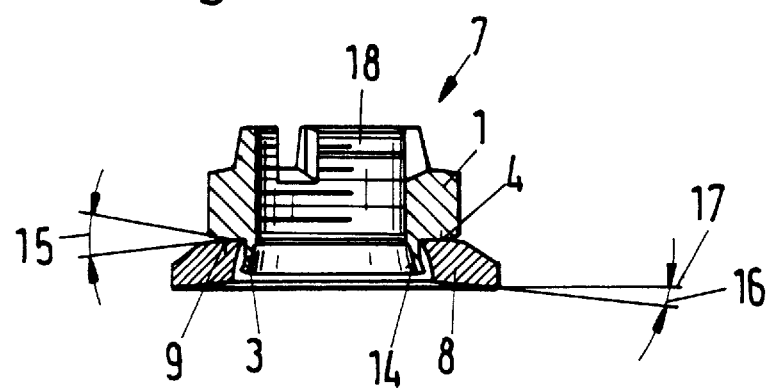
FIG. 3a is an axial sectional view of a modified composite internally threaded fastener.
Figure 3B:
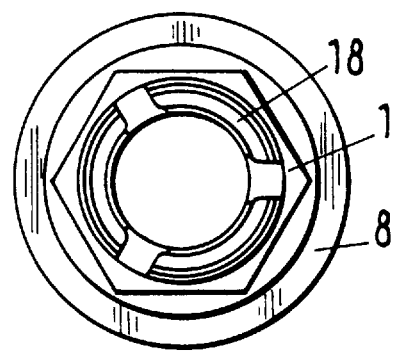

FIGS. 3a and 3b illustrate a modified internally threaded composite fastener 7' which comprises a modified nut 1' as well as a modified washer 8'. The neck 3' of the nut 1' has a passage 14 with a diameter which is greater than that of the passage in the main section of the nut 1'; this can be achieved by resorting to a turning or other suitable operation. At least the free end of the neck 3' is expanded radialy outwardly to establish with the conically diverging internal surface of the washer 8' a connection which ensures that the shoulder 4' of the main section of the nut 1' and the adjacent surface of the washer 8' are maintained at a desired axial distance from (e.g., in actual contact with) each other.

FIG. 3a shows that the shoulder 4' and the adjacent surface of the washer 8' make a relatively small acute angle 15 which diverges radially outwardly, i.e., away from the common axis of the main section and the neck 3' of the nut 1'. The exposed end face of the washer 8' and a plane 17 which is at least substantially normal to the axis of the nut 1' make a second acute angle 16 which also diverges radially outwardly and is smaller than the angle 15. However, it is also possible to select an angle 16 which more closely approaches, or which is identical with, the angle 15. Still further, the size of the angle 16 can be reduced at least close to zero, i.e., the washer 8' can be replaced with a washer having an end face which, in lieu of being conical as shown in FIG. 3a, can be located in a plane which is normal to the axis of such modified washer, i.e., which is normal to the axis of the nut 1' when the modified washer is coupled with the neck 3'. Still further, it is possible to replace the washer 8' with a washer which has a convex (such as part spherical) exposed end face, i.e., which comes into a mere linear contact with an object (such as the axle of a motor vehicle) having a surface represented by the plane 17 shown in FIG. 3a when the nut 1' is tightened while its internal thread mates with the external thread of a stud extending from the surface of the axle and serving to support the hub of a wheel in a motor vehicle.

It is also within the purview of the invention to reduce the size of or to eliminate the angle 15, i.e., to configurate the shoulder 4' and the adjacent surface of the washer 8' in such a way that these parts are in a relatively large surface-to-surface contact with each other when the expanding of the free end of the neck 3' is completed so that the washer is coupled to the nut 1'.

The nut 1' is provided with a substantially sleeve-like extension 18 of one piece with that end portion of the main section of the nut 1' which is remote from the neck 3'. The extension 18 is provided with substantially axially parallel slots (shown but not referenced in FIGS. 3a and 3b) which alternate with preferably flexible tongues (as seen in the circumferential direction of the extension). The extension 18 constitutes a safety device or clamping device; this is fully described in the commonly owned German patent application No. 195 32 708.8, in the commonly owned published German patent application No. 43 07 090, and in the commonly owned published German patent application No. 43 07 091 to which reference may be had, if necessary.

The illustrated extension 18 can be replaced with other suitable clamping or safety devices, for example, with a ring made of a suitable plastic material such as polyamide, with a sleeve-like portion having radially inwardly deformed protuberances which can engage an externally threaded fastener, or with a portion having a non-circular (such as oval) configuration.

The conical internal surface of the radially outwardly expanded neck 3' can serve as a means for centering a tool (not shown) which is used to provide the main section of the nut 1' (and if desired or necessary also the prongs or tongues of the extension 18) with an internal thread complementary to the external thread of a second fastener which is used with the improved internally threaded fastener 7 or 7' in a motor vehicle or for any other purpose.

The material of the washer 8 or 8' is or can be selected in such a way that it can undergo repeated elastic deformation. The extent of such deformation can depend upon one or more parameters such as the selected cross-sectional area of the washer, a dimension of the washer as measured radially of the axis of the nut 1 or 1', the configuration of that end face of the washer which is to engage an object when the nut 1 or 1' is tightened while meshing with an externally threaded fastener (as shown in FIG. 3a, the exposed end face of the washer 8' can constitute a concave surface), and the material of the washer. The elasticity of the washer can be selected in such a way that its deformation disappears when the nut is loosened while meshing with an externally threaded fastener, or when the nut is disengaged from the externally threaded fastener, even if such loosening or separation is repeated again and again.

The force which is exerted upon an adjacent object (refer again to the plane 17 which can be the plane of a surface engaged by the washer 8' when the composite fastener 7' of FIGS. 3a and 3b is in actual use) when the washer is elastically deformed can contribute significantly to the strength and reliability of engagement between the object and the washer. Moreover, such force can compensate for eventual inaccuracies of the internal thread in the nut 1 or 1' and/or for inaccuracies in the configuration of the external thread of a fastener which cooperates with the fastener 7 or 7'. Still further, such force can compensate for eventual inaccuracies in the finish and/or orientation of the exposed end face of the washer 8 or 8' and/or of the surface of an object which is engaged by the washer in actual use of the improved composite fastener. In addition, elastic deformability of the washer contributes to more uniform distribution of stresses between the nut and the adjacent object in actual use of the improved composite fastener. Still further, the composite fastener is much less likely to be accidentally loosened (e.g., as a result of vibration or other undesirable stray movements) if a tightening of the nut 1 or 1' on the complementary externally threaded fastener (such as a bolt or stud) is preceded by at least some elastic deformation of the washer which is coupled to the neck of the nut. This will be readily appreciated since the improved composite fastener will continue to perform its intended function even if the nut 1 or 1' is partially loosened on the externally threaded fastener, as long as the washer is still subjected to at least some elastic deformation.

The magnitude of the force which develops as a result of elastic deformation of the washer can be selected with a high degree of accuracy by appropriate selection of the angle 15 and/or 16, e.g., in such a way that the angle 15 is greater than the angle 16.

The disclosure of the commonly owned copending patent application Ser. No. 08/528,894 (filed by Ewald Bächle on Sep. 15, 1995 for INTERNALLY THREADED FASTENER) is incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of internally threaded fasteners and, therefore, such adaptations should and are intended to be comprehended within the meaning and range of equivalence of the appended claims.

What is claimed is:

1. A method of making and assembling a fastener, composed of (a) a nut comprising a torque-receiving tubular section having a first end portion and a second end portion and a cylindrical neck coaxially with said tubular section and being formed at said second end portion of said tubular section and said neck having an open end portion and (b) a substantially ring-shaped washer, said method comprising the steps of converting a blank into said nut;

inserting the cylindrical neck of the thus obtained nut at least partially through the washer in such a way that the open end portion of said neck is accessible;

expanding the accessible open end portion of the neck radially outward to thus establish a non-separable connection between the washer and the nut; and subsequent to expanding the accessible open end of the neck, providing at least the tubular section of the nut with an internal thread.

2. The method of claim 1, wherein said converting step includes massive forming of the nut.

3. The method of claim 2, wherein said massive forming includes press forging.

4. The method of claim 2, wherein said massive forming includes cold forming.

5. The method of claim 1, wherein said converting step includes turning.

6. The method of claim 1, further comprising the step of tempering the converted blank.

7. The method of claim 1, further comprising the step of surface treating the converted blank.

8. The method of claim 7, wherein said surface treating step is carried out subsequent to said inserting step.

9. The method of claim 1, wherein said thread providing step comprises cutting the internal thread at least into said tubular section of the converted blank.

10. The method of claim 1, wherein said thread providing step includes tapping the internal thread at least into the tubular section of the converted blank.

11. The method of claim 1, wherein said converting step includes massive forming of the nut, and further comprising the step of converting a second blank into said washer prior to said inserting step, said step of converting said second blank including massive forming of the washer.

12. The method of claim 1, further comprising the step of converting a second blank into said washer prior to said inserting step.

13. The method of claim 12, wherein said step of converting said second blank includes massive forming of the washer.

14. The method of claim 13, wherein said massive forming includes press forging.

15. The method of claim 14, further comprising the step of cold forming the converted second blank upon completion of said press forging step.

16. The method of claim 13, wherein said massive forming includes cold forming.

17. The method of claim 12, wherein said step of converting said second blank includes turning.

18. The method of claim 12, further comprising the step of tempering the converted second blank.

19. The method of claim 12, further comprising the step of surface treating the converted second blank.

20. The method of claim 19, wherein said surface treating step is carried out subsequent to said inserting step.

* * * * *